US009685877B2

(12) United States Patent
Miura et al.

(10) Patent No.: US 9,685,877 B2
(45) Date of Patent: Jun. 20, 2017

(54) POWER CONVERSION APPARATUS (71) Applicant: Toyota Jidosha Kabushiki Kaisha, Toyota-shi, Aichi-ken (JP)

(72) Inventors: Mitsuhiro Miura, Toyota (JP); Naoto Hasegawa, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/950,210

(22) Filed: Nov. 24, 2015

(65) Prior Publication Data

US 2016/0156272 A1 Jun. 2, 2016

(30) Foreign Application Priority Data

Nov. 27, 2014 (JP) ................. 2014-240444

(51) Int. Cl.
*H02M 3/335* (2006.01)
*H02M 3/158* (2006.01)
*H02M 1/00* (2006.01)

(52) U.S. Cl.
CPC ..... *H02M 3/33584* (2013.01); *H02M 3/1582* (2013.01); *H02M 3/33561* (2013.01); *H02M 2001/009* (2013.01); *H02M 2001/0064* (2013.01)

(58) Field of Classification Search
CPC .. H02M 3/325; H02M 3/335; H02M 3/33569; H02M 3/33507; H02M 7/521; H02M 7/5387; H02M 7/53871
USPC .................................. 363/16, 17, 95, 97, 98
See application file for complete search history.

(56) References Cited

U.S. PATENT DOCUMENTS

| 8,829,713 B2* | 9/2014 | Ishigaki | B60R 25/00 |
| | | | 307/66 |
| 2011/0198933 A1 | 8/2011 | Ishigaki et al. | |
| 2012/0147629 A1* | 6/2012 | Mao | H02M 3/28 |
| | | | 363/17 |
| 2014/0132066 A1* | 5/2014 | Hirano | H02M 3/33584 |
| | | | 307/17 |
| 2014/0133187 A1* | 5/2014 | Hirano | H02M 3/33592 |
| | | | 363/17 |
| 2014/0233265 A1* | 8/2014 | Hirano | H02M 3/33576 |
| | | | 363/17 |

(Continued)

FOREIGN PATENT DOCUMENTS

JP  2011-193713 A  9/2011

*Primary Examiner* — Adolf Berhane
(74) *Attorney, Agent, or Firm* — Dinsmore & Shohl LLP (57) ABSTRACT

A power conversion apparatus includes a transformer comprising a primary coil and a secondary coil; a primary full-bridge circuit comprising the primary coil disposed at a first bridge part; a secondary full-bridge circuit comprising the secondary coil disposed at a second bridge part; and a control unit configured to control a phase difference between switching at the primary full-bridge circuit, and switching at the secondary full-bridge circuit, to adjust transmission power transmitted between the primary full-bridge circuit and the secondary full-bridge circuit. When an absolute value of the phase difference is less than or equal to a first predetermined value, the control unit inverts a positive and a negative of the phase difference, to switch a power transmission direction between the primary full-bridge circuit and the secondary full-bridge circuit.

9 Claims, 6 Drawing Sheets (56) References Cited

U.S. PATENT DOCUMENTS

2014/0237280 A1* 8/2014 Muto .................... G06F 1/3293
  713/323
2016/0190944 A1* 6/2016 Uchihara .......... H02M 3/33561
  363/17

* cited by examiner

FIG.7

POWER CONVERSION APPARATUS

CROSS-REFERENCE TO RELATED APPLICATIONS

This application claims priority to Japanese Patent Application No. 2014-240444, filed on Nov. 27, 2014, the entire contents of which are hereby incorporated by reference.

FIELD

The disclosures herein generally relate to a power conversion apparatus.

BACKGROUND

A power conversion apparatus has been known that includes a transformer having a primary coil and a secondary coil, a primary full-bridge circuit having the primary coil of the transformer disposed at a bridge part, and a secondary full-bridge circuit having the secondary coil of the transformer disposed at a bridge part (see, for example, Patent Document 1). This power conversion apparatus includes a control unit that controls the phase difference $\phi$ between switching at the primary full-bridge circuit, and switching at the secondary full-bridge circuit, to adjust transmission power P, which is transmitted between the primary full-bridge circuit and the secondary full-bridge circuit.

RELATED-ART DOCUMENTS

Patent Documents

[Patent Document 1] Japanese Laid-open Patent Publication No. 2011-193713

Figure 1:
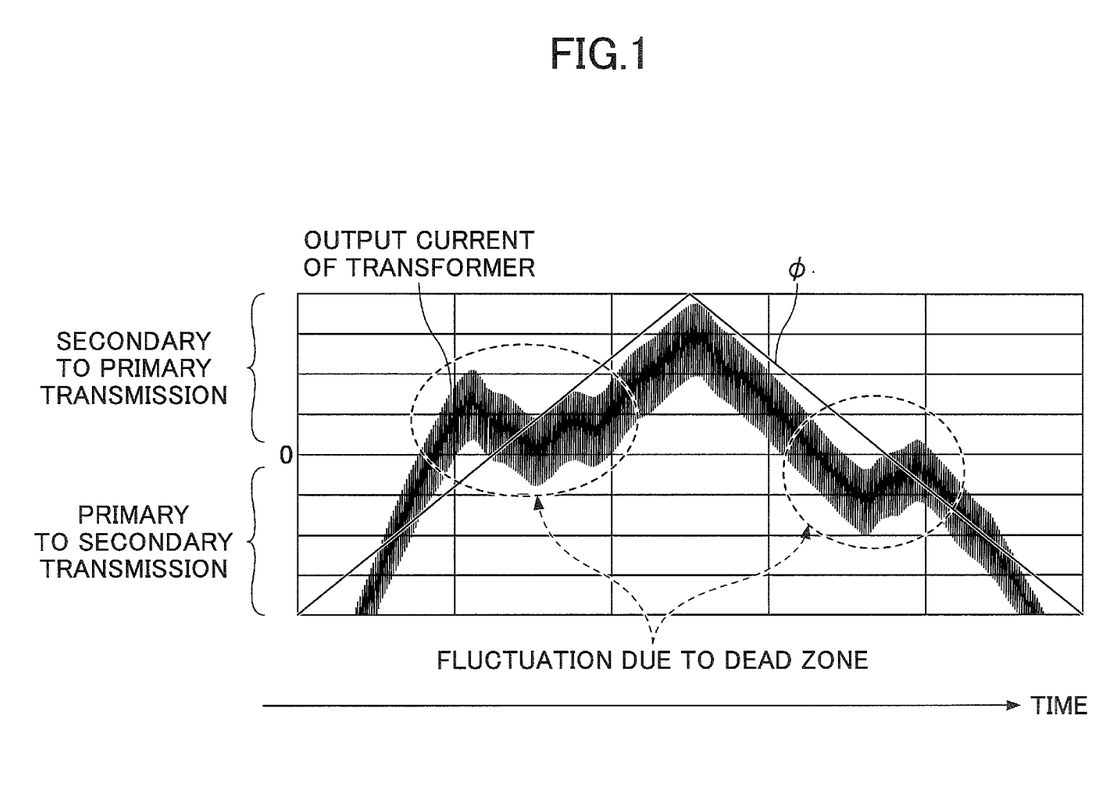
FIG. 1 is a diagram that illustrates an example of an operational waveform when the phase difference is about zero.

This sort of power conversion apparatus has a function to switch the transmission direction of the transmission power P (the power transmission direction) between the primary full-bridge circuit and the secondary full-bridge circuit, by switching the positive and negative of the phase difference $\phi$. However, as illustrated in FIG. 1, there is a dead zone around zero at which the power transmission direction is switched, within a range where the phase difference $\phi$ needs to be controlled, but the magnetic field of the transformer tends to be unstable, and the increase and decrease of the phase difference $\phi$ do not exhibit a one-to-one correspondence with the increase and decrease of the transmission power P. Therefore, it is difficult to control a timing to switch the power transmission direction as intended.

Thereupon, it is a general object of at least one of the embodiments of the present disclosure to provide a power conversion apparatus with which it is easier to control a timing to switch the power transmission direction as intended.

SUMMARY

According to at least one embodiment of the present disclosure, a power conversion apparatus includes a transformer that includes a primary coil and a secondary coil; a primary full-bridge circuit that includes the primary coil disposed at a first bridge part; a secondary full-bridge circuit that includes the secondary coil disposed at a second bridge part; and a control unit configured to control a phase difference between switching at the primary full-bridge circuit, and switching at the secondary full-bridge circuit, to adjust transmission power transmitted between the primary full-bridge circuit and the secondary full-bridge circuit. When an absolute value of the phase difference is less than or equal to a first predetermined value, the control unit inverts a positive and a negative of the phase difference, to switch a power transmission direction between the primary full-bridge circuit and the secondary full-bridge circuit.

According to at least one embodiment of the present disclosure, the control unit can control the phase difference while skipping over around zero where the increase and decrease of the phase difference do not exhibit a one-to-one correspondence with the increase and decrease of the transmission power, and hence, it easier for the control unit to control a timing to switch the power transmission direction as intended.

According to at least one embodiment of the present disclosure, a power conversion apparatus includes a transformer comprising a primary coil and a secondary coil. The power conversion apparatus further includes a primary full-bridge circuit that includes a first arm circuit including a first upper arm and a first lower arm connected in series, and a second arm circuit including a second upper arm and a second lower arm connected in series. The primary coil is included in a first bridge part that connects a first middle point between the first upper arm and the first lower arm and a second middle point between the second upper arm and the second lower arm. The power conversion apparatus further includes a secondary full-bridge circuit that includes a third arm circuit including a third upper arm and a third lower arm connected in series, and a fourth arm circuit including a fourth upper arm and a fourth lower arm connected in series. The secondary coil is included in a second bridge part that connects a third middle point between the third upper arm and the third lower arm and a fourth middle point between the fourth upper arm and the fourth lower arm. The power conversion apparatus further includes a control unit that adjusts a first phase difference between switching in the first arm circuit and switching in the third arm circuit and a second phase difference between switching in the second arm circuit and switching in the fourth arm circuit, and controls transmission power transmitted between the primary full-bridge circuit and the secondary full-bridge circuit. When an absolute value of at least one of the first phase difference and the second phase difference is less than or equal to a first predetermined value, the control unit switches a power transmission direction between the primary full-bridge circuit and the secondary full-bridge circuit.

DESCRIPTION OF EMBODIMENTS

In the following, embodiments of the present disclosure will be described with reference to the drawings.

Figure 2:
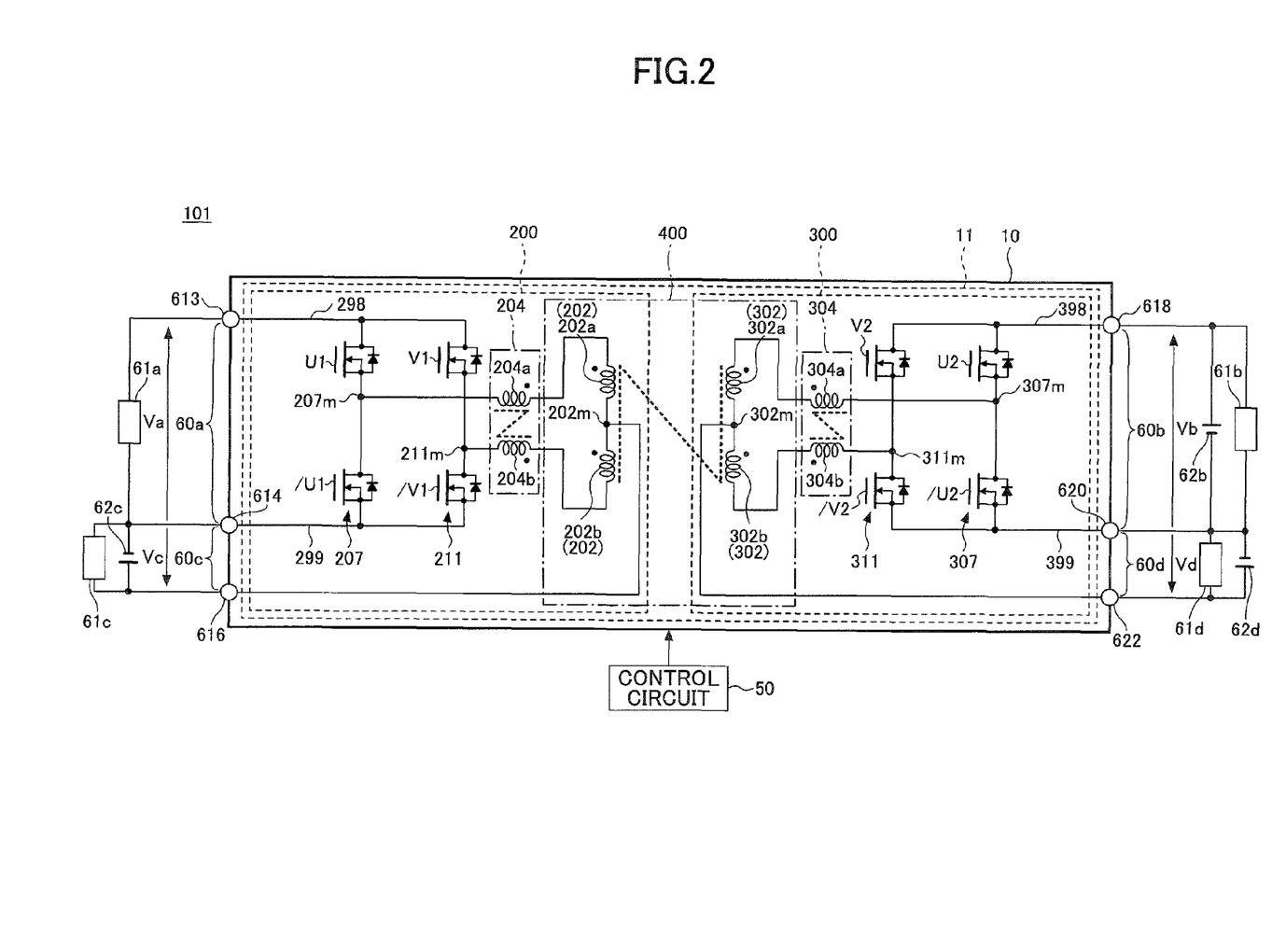
FIG. 2 is a diagram that illustrates an example of a power conversion apparatus.

FIG. 2 is a configuration of a power supply apparatus 101 as an embodiment of a power conversion apparatus. The power supply apparatus 101 is installed, for example, in a vehicle such as an automobile, and is an example of a power supply system for the vehicle to distribute power to loads installed in the vehicle. The power supply apparatus 101 includes, for example, a power supply circuit 10, and a control circuit 50.

The power supply circuit 10 is an example of a power conversion circuit that includes multiple (at least three or more) ports, and has a function to convert power between two ports selected arbitrarily among the multiple ports. The power supply circuit 10 in the present embodiment includes four ports, for example, a first port 60a, a second port 60c, a third port 60b, and a fourth port 60d, and also includes a converter 11.

The first port 60a is an example of a first terminal part of the power supply circuit 10 and is connected with, for example, a load 61a.

The load 61a is an example of one or more high-voltage loads on the primary side. As a specific example of the high-voltage (for example, 48 V) load 61a, an electrically-driven power steering apparatus to assist steering, may be considered.

The second port 60c is an example of a second terminal part of the power supply circuit 10, and is connected with, for example, a battery 62c and a load 61c.

The battery 62c is an example of a low-voltage power source on the primary side that can supply direct-current (DC) power to the load 61c operating on the same voltage as the battery 62c. The low-voltage (for example, 12 V, which is lower than 48 V) battery 62c may be called an auxiliary battery. As a specific example of the battery 62c, a secondary battery such as a lead battery may be considered. The battery 62c may be charged by, for example, a charge unit such as an alternator (not illustrated).

The load 61c is an example of one or more low-voltage loads on the primary side. The load 61c may be called an auxiliary load. As a specific example of the load 61c, an ECU (electronic control unit) to control predetermined devices may be considered.

The third port 60b is an example of a third terminal part of the power supply circuit 10, and is connected with, for example, a battery 62b and a load 61b.

The battery 62b is an example of a high-voltage power source on the secondary side that can supply DC power to the load 61b operating on the same voltage as the battery 62b. The high-voltage (for example, 288 V, which is higher than 48 V) battery 62b may be called a propulsion battery or a traction battery. As a specific example of the battery 62b, a secondary battery such as a lithium-ion battery may be considered. The battery 62c may be charged by, for example, regenerative power from the load 61b.

The load 61b is an example of one or more high-voltage loads on the secondary side. As a specific example of the load 61b, an inverter to convert DC power to alternating-current (AC) power may be considered.

The fourth port 60d is an example of a fourth terminal part of the power supply circuit 10, and is connected with, for example, a power source 62d and a load 61d.

The power source 62d is an example of a low-voltage power source on the secondary side that can supply DC power to at least one of the fourth port 60d and the load 61d. As specific examples of the low-voltage (for example, 72 V, which is lower than 288 V) power source 62d, a solar power source (a solar power generator), an AC-DC converter to convert commercial AC power to DC power, a secondary battery and the like, may be considered.

The load 61d is an example of one or more low-voltage loads on the secondary side that operate on the same voltage as the power source 62d. Port voltages Va, Vb, Vc, and Vd are input or output voltages at the first port 60a, the third port 60b, the second port 60c, and the fourth port 60d, respectively.

The converter 11 is an example of a DC-DC converter that applies voltage conversion to DC power input at one port, and outputs the DC power having the voltage conversion applied to the other port. The converter 11 in the present embodiment includes, for example, a transformer 400, a primary full-bridge circuit 200, and a secondary full-bridge circuit 300. The primary full-bridge circuit 200 and the secondary full-bridge circuit 300 are magnetically coupled in the transformer 400. Ports on the primary side including the first port 60a and the second port 60c, and ports on the secondary side including the third port 60b and the fourth port 60d, are connected via the transformer 400.

The transformer 400 includes a primary coil 202 and a secondary coil 302, and has magnetic coupling between the primary coil 202 and the secondary coil 302 by a coupling coefficient kT, to function as a transformer having the ratio of the numbers of turns 1:N between the primary coil 202 and the secondary coil 302. Here, N is a positive number greater than 1. The transformer 400 is, for example, a center-tap transformer having center taps 202m and 302m.

The primary coil 202 includes a first winding on the primary side 202a, a second winding on the primary side 202b, and the center tap 202m that is drawn out from an intermediate connection point between the first winding on the primary side 202a, and the second winding on the primary side 202b. The number of turns of the first winding on the primary side 202a is equivalent to the number of turns of the second winding on the primary side 202b. The center tap 202m is connected with a higher potential terminal 616 of the second port 60c.

The secondary coil 302 includes a first winding on the secondary side 302a, a second winding on the secondary side 302b, and the center tap 302m that is drawn out from an intermediate connection point between the first winding on the secondary side 302a and the second winding on the secondary side 302b. The number of turns of the first winding on the secondary side 302a is equivalent to the number of turns of the second winding on the secondary side 302b. The center tap 302m is connected with a higher potential terminal 622 of the fourth port 60d.

The primary full-bridge circuit 200 is disposed on the primary side of the transformer 400. The primary full-bridge circuit 200 is an example of a power conversion part on the primary side that includes the primary coil 202 of the transformer 400, a magnetic coupling reactor on the primary side 204, a first upper arm U1, a first lower arm /U1, a second upper arm V1, and a second lower arm /V1.

The first upper arm U1, the first lower arm /U1, the second upper arm V1, and the second lower arm /V1 are switching elements that include, for example, N-channel MOSFETs and body diodes (parasitic diodes), which are parasitic elements of the MOSFETs, respectively. Diodes may be additionally connected in parallel with the arms.

The primary full-bridge circuit 200 includes a positive bus-bar on the primary side 298 that is connected with a higher potential terminal 613 of the first port 60a, and a negative bus-bar on the primary side 299 that is connected with a lower potential terminal 614 of the first port 60a and the second port 60c.

A first arm circuit 207 includes the first upper arm U1 and the first lower arm /U1 connected in series, and is connected between the positive bus-bar on the primary side 298, and the negative bus-bar on the primary side 299. The first arm circuit 207 is an example of a first power conversion circuit part on the primary side (a U-phase power conversion circuit part on the primary side) that can execute power conversion by on and off switching operations of the first upper arm U1 and the first lower arm /U1.

A second arm circuit 211 includes the second upper arm V1 and the second lower arm /V1 connected in series, and is connected between the positive bus-bar on the primary side 298, and the negative bus-bar on the primary side 299. The second arm circuit 211 is connected in parallel with the first arm circuit 207. The second arm circuit 211 is an example of a second power conversion circuit part on the primary side (a V-phase power conversion circuit part on the primary side) that can execute power conversion by on and off switching operations of the second upper arm V1 and the second lower arm /V1.

The primary coil 202 and the magnetic coupling reactor on the primary side 204 are disposed at the bridge part that connects the middle point 207m of the first arm circuit 207, with the middle point 211m of the second arm circuit 211. Describing connections in the bridge part in detail, the middle point 207m of the first arm circuit 207 is connected with one terminal of the first reactor on the primary side 204a of the magnetic coupling reactor on the primary side 204. Also, the other terminal of the first reactor on the primary side 204a is connected with one terminal of the primary coil 202. Further, the other terminal of the primary coil 202 is connected with one terminal of the second reactor on the primary side 204b of the magnetic coupling reactor on the primary side 204. Further, the other terminal of the second reactor on the primary side 204b is connected with the middle point 211m of the second arm circuit 211.

The magnetic coupling reactor on the primary side 204 includes the first reactor on the primary side 204a, and the second reactor on the primary side 204b that has magnetic coupling with the first reactor on the primary side 204a by a coupling coefficient k1.

The middle point 207m is a first intermediate node on the primary side between the first upper arm U1 and the first lower arm /U1, and the middle point 211m is a second intermediate node on the primary side between the second upper arm V1 and the second lower arm /V1. The middle point 207m is connected with the middle point 211m via the first reactor on the primary side 204a, the primary coil 202, and the second reactor on the primary side 204b, in this order.

The first port 60a is connected with the primary full-bridge circuit 200, and is an input/output port that is disposed between the positive bus-bar on the primary side 298 and the negative bus-bar on the primary side 299. The first port 60a includes the higher potential terminal 613 and the lower potential terminal 614.

The second port 60c is connected with the center tap 202m on the primary side of the transformer 400, and is an input/output port that is disposed between the negative bus-bar on the primary side 299, and the center tap 202m of the primary coil 202. The second port 60c includes the lower potential terminal 614 and the higher potential terminal 616.

The secondary full-bridge circuit 300 is disposed on the secondary side of the transformer 400. The secondary full-bridge circuit 300 is an example of a power conversion part on the secondary side that includes the secondary coil 302 of the transformer 400, a third upper arm U2, a third lower arm /U2, a fourth upper arm V2, and a fourth lower arm /V2.

The third upper arm U2, the third lower arm /U2, the fourth upper arm V2, and the fourth lower arm /V2 are switching elements that include, for example, N-channel MOSFETs and body diodes (parasitic diodes), which are parasitic elements of the MOSFETs, respectively. Diodes may be additionally connected in parallel with the arms.

The secondary full-bridge circuit 300 includes a positive bus-bar on the secondary side 398 that is connected with a higher potential terminal 618 of the third port 60b, and a negative bus-bar on the secondary side 399 that is connected with a lower potential terminal 620 of the third port 60b and the fourth port 60d.

A third arm circuit 307 includes the third upper arm U2 and the third lower arm /U2 connected in series, and is connected between the positive bus-bar on the secondary side 398 and the negative bus-bar on the secondary side 399. The third arm circuit 307 is an example of a first power conversion circuit part on the secondary side (a U-phase power conversion circuit part on the secondary side) that can execute power conversion by on and off switching operations of the third upper arm U2 and the third lower arm /U2.

A fourth arm circuit 311 includes the fourth upper arm V2 and the fourth lower arm /V2 connected in series, and is connected between the positive bus-bar on the secondary side 398 and the negative bus-bar on the secondary side 399. The fourth arm circuit 311 is connected in parallel with the third arm circuit 307. The fourth arm circuit 311 is an example of a second power conversion circuit part on the secondary side (a V-phase power conversion circuit part on the secondary side) that can execute power conversion by on and off switching operations of the fourth upper arm V2 and the fourth lower arm /V2.

The secondary coil 302 and the magnetic coupling reactor 304 on the secondary side are disposed at the bridge part that connects the middle point 307m of the third arm circuit 307, with the middle point 311m of the fourth arm circuit 311. Describing connections in the bridge part in detail, the middle point 307m of the third arm circuit 307 is connected with one terminal of the first reactor on the secondary side 304a of the magnetic coupling reactor on the secondary side 304. Also, the other terminal of the first reactor on the secondary side 304a is connected with one terminal of the secondary coil 302. Further, the other terminal of the secondary coil 302 is connected with one terminal of the second reactor on the secondary side 304b of the magnetic coupling reactor on the secondary side 304.

Further, the other terminal of the second reactor on the secondary side 304b is connected with the middle point 311m of the fourth arm circuit 311.

The magnetic coupling reactor on the secondary side 304 includes the first reactor on the secondary side 304a, and the second reactor on the secondary side 304b that has magnetic coupling with the first reactor on the secondary side 304a by a coupling coefficient k2.

The middle point 307m is a first intermediate node on the secondary side between the third upper arm U2 and the third lower arm /U2, and the middle point 311m is a second intermediate node on the secondary side between the fourth upper arm V2 and the fourth lower arm /V2. The middle point 307m is connected with the middle point 311m via the first reactor 304a on the secondary side, the secondary coil 302, and the second reactor 304b on the secondary side, in this order.

The third port 60b is connected with the secondary full-bridge circuit 300, and is an input/output port that is disposed between the positive bus-bar on the secondary side 398 and the negative bus-bar on the secondary side 399. The third port 60b includes the higher potential terminal 618 and the lower potential terminal 620.

The fourth port 60d is connected with the center tap 302m on the secondary side of the transformer 400, and is an input/output port that is disposed between the negative bus-bar on the secondary side 399, and the center tap 302m of the secondary coil 302. The fourth port 60d includes the lower potential terminal 620 and the higher potential terminal 622.

The control circuit 50 is an example of a control unit that controls a voltage conversion operation of the converter 11, generates a control signal to have the converter 11 execute a voltage conversion operation, and outputs it to the converter 11. The control circuit 50 in the present embodiment outputs control signals to turn on and off the arms in the primary full-bridge circuit 200 and the secondary full-bridge circuit 300. The control circuit 50 is a microcomputer that includes, for example, a CPU (Central Processing Unit), or an electronic circuit that includes a microcomputer.

Figure 3:
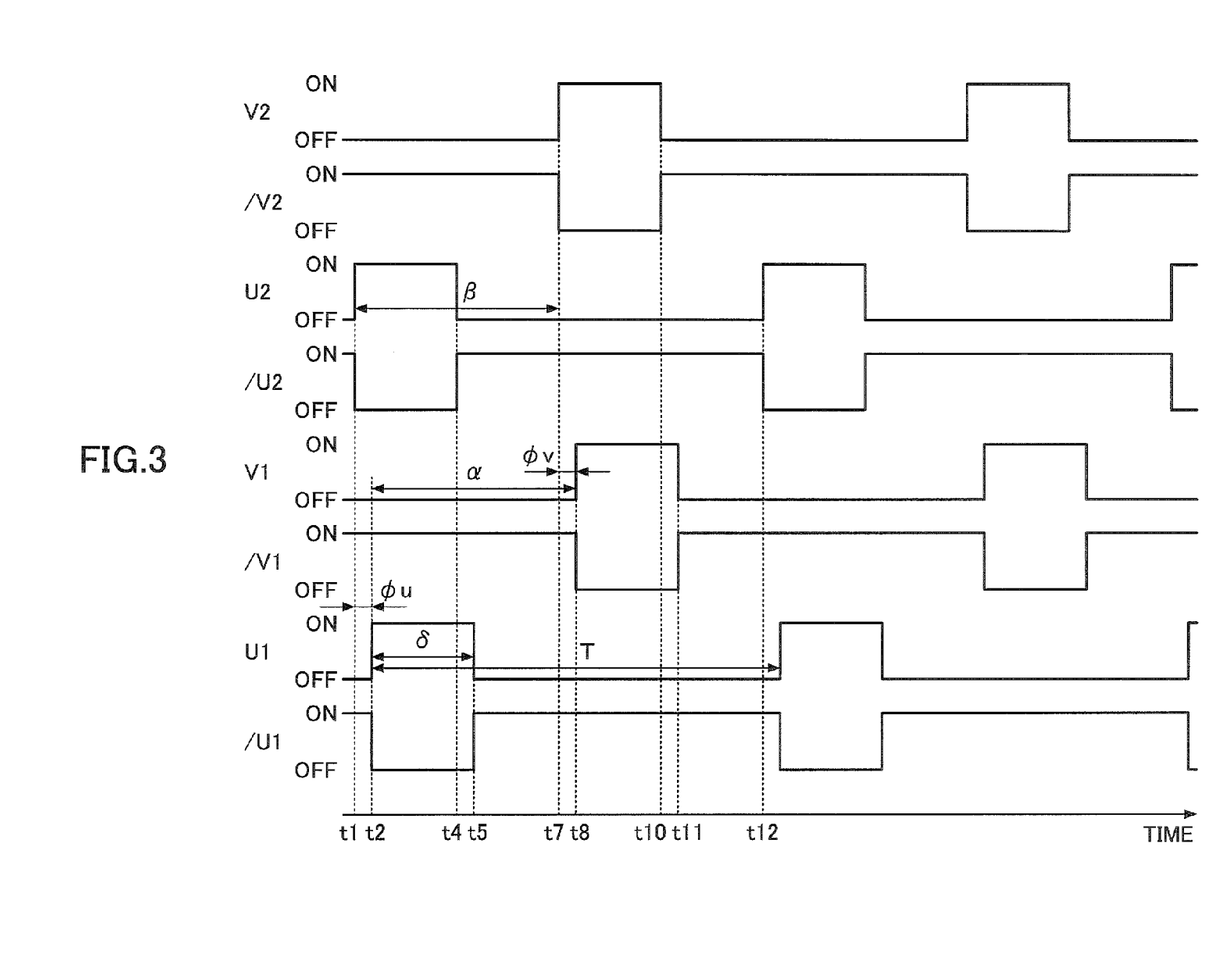
FIG. 3 is a timing chart that illustrates an example of an operation of a power conversion apparatus.

FIG. 3 is an example of a timing chart that illustrates on and off operations of the arms. In FIG. 3, U1 is an on/off waveform of the first upper arm U1; V1 is an on/off waveform of the second upper arm V1; U2 is an on/off waveform of the third upper arm U2; and V2 is an on/off waveform of the fourth upper arm V2. On/off waveforms of the first lower arm /U1, the second lower arm /V1, the third lower arm /U2, and the fourth lower arm /V2 are inverted waveforms of the on/off waveforms of the first upper arm U1, the second upper arm V1, the third upper arm U2, and the fourth upper arm V2, respectively.

Note that a dead time may be provided between the on/off waveforms of the upper and lower arms, to prevent a through-current from flowing when both the upper and lower arms turn on. Also, in the eight on/off waveforms illustrated in FIG. 3, the high level represents the on state, and the low-level represents the off state.

The control circuit 50 repeatedly generates a switching pattern that includes four periods, to have the arms turn on and off. A first period t2-t4 is a period during which the upper arms U1 and U2, and the lower arms /V1 and /V2 are turned on, and the upper arms V1 and V2, and the lower arms /U1 and /U2 are turned off. A second period t5-t7 is a period during which the lower arms /U1 and /U2, and the lower arms /V1 and /V2 are turned on, and the upper arms U1 and U2, and the upper arms V1 and V2 are turned off. A third period t8-t10 is a period during which the lower arms /U1 and /U2, and the upper arms V1 and V2 are turned on, and the upper arms U1 and U2, and the lower arms /V1 and /V2 are turned off. A fourth period t11-t12 is a period during which the lower arms /U1 and /U2, and the lower arms /V1 and /V2 are turned on, and the upper arms U1 and U2, and the upper arms V1 and V2 are turned off.

For example, by controlling a duty cycle D (=δ/T), the control circuit 50 can change a boost ratio or a step-down ratio of both full-bridge circuits, or the primary full-bridge circuit 200 and the secondary full-bridge circuit 300.

The duty cycle D represents a ratio of an on time δ occupying a switching cycle T of the first upper arm U1 and the second upper arm V1 in the primary full-bridge circuit 200, and also represents a ratio of an on time δ occupying the switching cycle T of the third upper arm U2 and the fourth upper arm V2 in the secondary full-bridge circuit 300. The duty cycle D of the first upper arm U1, and the duty cycle D of the second upper arm V1 are equivalent to each other. The duty cycle D of the third upper arm U2, and the duty cycle D of the fourth upper arm V2 are equivalent to each other. The boost/step-down ratio of the primary full-bridge circuit 200 is the transformation ratio between the first port 60a and the second port 60c. The boost/step-down ratio of the secondary full-bridge circuit 300 is the transformation ratio between the third port 60b and the fourth port 60d.

Therefore, they can be represented, for example, as follow:

The boost/step-down ratio of the primary full-bridge circuit 200=(Voltage of the second port 60c)/(Voltage of the first port 60a)=δ/T The boost/step-down ratio of the secondary full-bridge circuit 300=(Voltage of the fourth port 60d)/(Voltage of the third port 60b)=δ/T Note that the on time δ represents an on time of the first upper arm U1 and the second upper arm V1, and also represents an on time of the third upper arm U2 and the fourth upper arm V2. Also, the switching cycle T of the arms included in the primary full-bridge circuit 200 is equivalent to the switching cycle T of the arms included in the secondary full-bridge circuit 300.

Also, the control circuit 50 controls the phase difference α between U1 and V1 to be, for example, 180° (π) for normal operation, and controls the phase difference β between U2 and V2 to be 180° (π) for normal operation. The phase difference α between U1 and V1 is the time difference between timing t2 and timing t8, and the phase difference β between U2 and V2 is the time difference between timing t1 and timing t7.

Further, by controlling the phase difference φ (the phase difference φu and the phase difference φv), the control circuit 50 can adjust the transmission power P transmitted between the primary full-bridge circuit 200 and the secondary full-bridge circuit 300 via the transformer 400.

The phase difference φ is a shift (a time lag) of switching timings between the power conversion circuit parts operating on the same phase in the primary full-bridge circuit 200 and the secondary full-bridge circuit 300, respectively.

The phase difference φu is a shift of switching timings between corresponding phases in the first arm circuit 207 and the third arm circuit 307, respectively, and also is a time difference between switching of the first arm circuit 207, and switching of the third arm circuit 307. For example, the phase difference φu is the difference between timing t2 at which the first upper arm U1 turns on, and timing t1 at which the third upper arm U2 turns on. The switching of the first arm circuit 207, and the switching of the third arm circuit 307 are controlled in the same phase to each other (namely, U-phase) by the control circuit 50.

The phase difference φv is a shift of switching timings between corresponding phases in the second arm circuit 211 and the fourth arm circuit 311, respectively, and also is a time difference between switching of the second arm circuit 211, and switching of the fourth arm circuit 311. For example, the phase difference φv is the difference between timing t8 at which the second upper arm V1 turns on, and timing t7 at which the fourth upper arm V2 turns on. The switching of the second arm circuit 211, and the switching of the fourth arm circuit 311 are controlled in the same phase to each other (namely, V-phase) by the control circuit 50.

The control circuit 50 in the present embodiment can transmit the transmission power P from the secondary full-bridge circuit 300 to the primary full-bridge circuit 200, by controlling the phase difference φu to take a positive value and the phase difference φv to take a positive value. The control circuit 50 can also transmit the transmission power P from the primary full-bridge circuit 200 to the secondary full-bridge circuit 300, by controlling the phase difference φu to take a negative value and the phase difference φv to take a negative value. Namely, between the power conversion circuit parts operating on the same phase in the primary full-bridge circuit 200 and the secondary full-bridge circuit 300, respectively, the transmission power P is transmitted from one of the full-bridge circuits that has the power conversion circuit part whose upper arm turns on first, to the other full-bridge circuit that has the power conversion circuit part whose upper arm turns on later.

For example, in the case of FIG. 3, timing t1 at which the third upper arm U2 turns on is earlier than timing t2 at which the first upper arm U1 turns on (the phase difference φu is assumed to take a positive value if timing t1 is earlier than timing t2). Therefore, the transmission power P is transmitted from the secondary full-bridge circuit 300 including the third arm circuit 307 having the third upper arm U2, to the primary full-bridge circuit 200 including the first arm circuit 207 having the first upper arm U1. Similarly, timing t7 at which the fourth upper arm V2 turns on is earlier than timing t8 at which the second upper arm V1 turns on (the phase difference φv is assumed to take a positive value if timing t7 is earlier than timing t8). Therefore, the transmission power P is transmitted from the secondary full-bridge circuit 300 including the fourth arm circuit 311 having the fourth upper arm V2, to the primary full-bridge circuit 200 including the second arm circuit 211 having the second upper arm V1.

Although the control circuit 50 usually controls the phase difference φu and the phase difference φv to be equivalent to each other, the control circuit 50 may control the phase difference φu and the phase difference φv to be shifted relative to each other as long as precision is satisfied that is required for the transmission power P. Namely, although the phase difference φu and the phase difference φv are usually controlled to take values equivalent to each other, they may be controlled to take different values from each other as long as precision is satisfied that is required for the transmission power P.

The control circuit 50 controls the duty cycle D to be a command duty cycle Do, and outputs a control signal to control the phase difference φ to be a command phase difference φo to the converter 11, to have the arms of the primary full-bridge circuit 200 and the secondary full-bridge circuit 300 switch.

The control circuit 50 controls, for example, both duty cycles D of the primary full-bridge circuit 200 and the secondary full-bridge circuit 300 to be the same command duty cycle Do. On the other hand, the control circuit 50 controls, for example, the phase difference φu and the phase difference φv to be the same command phase difference φo.

The control circuit 50 derives the command duty cycle Do and the command phase difference φo, based on at least one of derivation references, which are, for example, a predetermined calculation formula and a map. The derivation method of the command duty cycle Do and the command phase difference φo may be arbitrary.

For example, by using a feedback value of the port voltage Vc detected by a detection circuit, the control circuit 50 derives the command duty cycle Do used for adjusting the port voltage Vc to take a target voltage Vco set to the second port 60c. On the other hand, for example, by using feedback values of the transmission power P, the port voltage Va, and the port voltage Vb detected by detection circuits, respectively, and the command transmission power Po, the control circuit 50 derives the command phase difference φo used for adjusting the port voltage Va to take a target voltage Vao set to the first port 60a. The command transmission power Po is transmission power P (a target value of the transmission power P) that is required for one of the full-bridge circuits, which are the primary full-bridge circuit 200 and the secondary full-bridge circuit 300, and transmitted from the other full-bridge circuit.

In the following, transmission power $P_{A+C}$ denotes transmission power P that is transmitted to the primary full-bridge circuit 200 from the secondary full-bridge circuit 300 via the transformer 400. The transmission power $P_{A+C}$ is equivalent to the sum of the port power Pa at the first port 60a and the port power Pc at the second port 60c. If the primary full-bridge circuit 200 executes a step-down operation to step down the power of the first port 60a to supply the stepped down power to the second port 60c, the port power Pc in "$P_{A+C}$=Pa+Pc" takes a positive value. On the other hand, if the primary full-bridge circuit 200 executes a boost operation to boost the power of the second port 60c to supply the boosted power to the first port 60a, the port power Pc in "$P_{A+C}$=Pa+Pc" takes a negative value.

The port power Pa is equivalent to the product of the port voltage Va of the first port 60a multiplied by the port current Ia of the first port 60a. The port power Pc is equivalent to the product of the port voltage Vc of the second port 60c multiplied by the port current Ic of the second port 60c.

In the following, transmission power $P_{B+D}$ denotes transmission power P that is transmitted to the secondary full-bridge circuit 300 from the primary full-bridge circuit 200 via the transformer 400. The above description about the transmission power $P_{A+C}$ is similarly applicable to the transmission power $P_{B+D}$.

In this way, by at least detecting the port voltages and the port currents of the ports by the detection circuits, the power supply apparatus 101 can control the duty cycle D and the phase difference φ, to execute power conversion between the ports.

Figure 4:
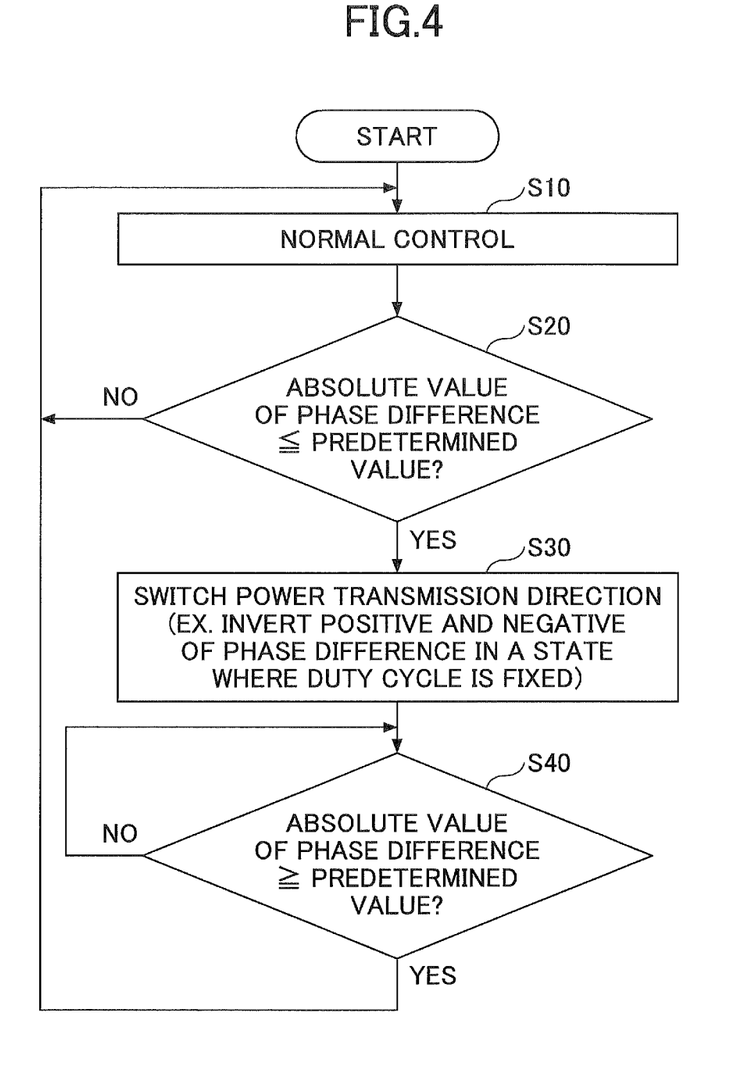
FIG. 4 is a flowchart that illustrates an example of switching control of the power transmission direction.

FIG. 4 is a flowchart that illustrates an example of switching control of the transmission direction of the transmission power P (the power transmission direction). The control circuit 50 has a function to switch the power transmission direction between the primary full-bridge circuit 200 and the secondary full-bridge circuit 300 by switching the phase difference φ between positive and negative.

At Step S10, the control circuit 50 controls the duty cycle D, following the command duty cycle Do derived by using a feedback value of the port voltage Vc detected by the detection circuit, and executes normal control to control the phase difference φ, following the command phase difference φo derived by using the command transmission power Po.

If transmitting the transmission power P at Step S10, for example, from the secondary full-bridge circuit 300 to the primary full-bridge circuit 200, the control circuit 50 controls the duty cycle D, following the command duty cycle Do to adjust the port voltage Vc to take the target voltage Vco, and controls the phase difference φ, following the command phase difference φo to adjust the port voltage Va to take the target voltage Vao.

At Step S20, the control circuit 50 determines whether the absolute value of the command phase difference φo is less than or equal to a first predetermined value φth1. The first predetermined value φth1 is a positive number greater than zero. At Step S20, if the absolute value of the command phase difference φo is determined not to be less than or equal to the first predetermined value φth1, the control circuit 50 repeats the normal control at Step S10. On the other hand, if the absolute value of the command phase difference φo is determined to be less than or equal to the first predetermined value φth1, the control circuit 50 changes the normal control at Step S10 to switching control at Step S30.

At Step S30, irrespective of the command transmission power Po, the control circuit 50 inverts the positive and negative of the command phase difference φo derived by using the command transmission power Po, to switch the power transmission direction between the primary full-bridge circuit 200 and the secondary full-bridge circuit 300. If having transmitted the transmission power P at Step S10, for example, from the secondary full-bridge circuit 300 to the primary full-bridge circuit 200, the control circuit 50 switches the power transmission direction to the direction from the primary full-bridge circuit 200 to the secondary full-bridge circuit 300.

By executing switching control like this, the control circuit 50 controls the phase difference φ, skipping over around zero where the increase and decrease of the phase difference φ do not exhibit a one-to-one correspondence with the increase and decrease of the transmission power P, and hence, a timing to switch the power transmission direction can be more easily controlled as intended.

Also, by controlling the phase difference φ skipping over around zero, for example, the control circuit 50 can control the phase difference φ, avoiding a range where the transmission power P increases even though the phase difference φ is decreased, and can control the phase difference φ avoiding a range where the transmission power P decreases even though the phase difference φ is increased.

Also, by controlling the phase difference φ skipping over around zero, for example, the control circuit 50 can control the phase difference φ, avoiding a range where the transmission power P is transmitted in a power transmission direction that corresponds to a case in which the phase difference φ is controlled to take a negative value, but it is intended to control the phase difference φ to take a positive value. Similarly, by controlling the phase difference φ skipping over around zero, for example, the control circuit 50 can control the phase difference φ, avoiding a range where the transmission power P is transmitted in a power transmission direction that corresponds to a case in which the phase difference φ is controlled to take a positive value, but it is intended to control the phase difference φ to take a negative value.

At Step S30, the control circuit 50 may invert the positive and negative of the command phase difference φo, for example, in a state where the command duty cycle Do is fixed for switching the primary full-bridge circuit 200 and the secondary full-bridge circuit 300.

If the positive and negative of the command phase difference φo are inverted irrespective of the command transmission power Po as described above, actual transmission power P is shifted with respect to the command transmission power Po. Therefore, the port voltage Va temporarily goes out of the target voltage Vao, and consequently, it is likely that the port voltage Vc will go out of target voltage Vco. In such a case, if the normal control is continued where the command duty cycle Do is derived by using a feedback value of the port voltage Vc detected by the detection circuit, it is likely that the derived command duty cycle Do will go out of a permissible range of the duty cycle D.

Therefore, by inverting the positive and negative of the command phase difference φo in a state where the command duty cycle Do is fixed, the control circuit 50 can prevent the command duty cycle Do from going out of a permissible range of the duty cycle D.

The control circuit 50 fixes the command duty cycle Do, for example, to an upper limit value Dmax in the permissible range of the duty cycle D at Step S30. The upper limit value Dmax is a maximum duty cycle with which the port voltage Vc can be adjusted to a maximum target voltage Vcomax possibly set as the target voltage Vco. The maximum target voltage Vcomax is a voltage higher than a nominal voltage Vcnom (for example, 12 V for a 12-V battery 62c) set to the second port 60c. By having the command duty cycle Do fixed to the upper limit value Dmax, power can be checked that could be taken out of the battery 62c due to reduction of the port voltage Vc.

The control circuit 50 may fix the command duty cycle Do, for example, to a nominal value Dnom of the duty cycle D at Step S30. The nominal value Dnom is a duty cycle with which the port voltage Vc can be adjusted to the nominal voltage Vcnom. In the normal control, since the command duty cycle Do should not be shifted from the nominal value Dnom so much, it is possible to make the port voltage Vc less likely to fluctuate largely, by having the command duty cycle Do fixed to the nominal value Dnom.

The control circuit 50 may fix the command duty cycle Do at Step 30, for example, to a value just before inverting the positive and negative of the command phase difference φo. This makes it possible to make the port voltage Vc even less likely to fluctuate largely.

The control circuit 50 may fix the command duty cycle Do, for example, to a lower limit value Dmin of the permissible range of the duty cycle D. The lower limit value Dmin is a minimum duty cycle with which the port voltage Vc can be adjusted to a minimum target voltage Vcomax possibly set as the target voltage Vco. The minimum target voltage Vcomin is a voltage lower than the nominal voltage Vcnom. By having the command duty cycle Do fixed to the lower limit value Dmin, it is possible to avoid degradation of the battery 62c or the load 61c, which may be caused by applying a comparatively high voltage to them.

At Step S40, the control circuit 50 determines whether the absolute value of the command phase difference φo is greater than or equal to a second predetermined value φth2. The second predetermined value φth2 is a positive number greater than zero. The second predetermined value φth2 may be the same value as the first predetermined value φth1, or may be a different value.

If the absolute value of the command phase difference φo is determined not to be greater than or equal to the second predetermined value φth2 at Step S40, the control circuit 50 controls the phase difference φ to be the command phase difference φo having the positive and negative inverted at Step S30, irrespective of the command transmission power Po. Namely, the control circuit 50 maintains the sign of the command phase difference φo to be the positive and negative that has been inverted at Step S30 until the absolute value of the command phase difference φo rises to be greater than or equal to the second predetermined value φth2. Thus, even if a command phase difference φo whose absolute value is less than the second predetermined value φth2, is derived at Step S40, the control circuit 50 can control the phase difference φ, avoiding the dead zone where the increase and decrease of the phase difference φ do not exhibit a one-to-one correspondence with the increase and decrease of the transmission power P.

On the other hand, if the absolute value of the command phase difference φo is determined to be greater than or equal to the second predetermined value φth2 at Step S40, the control circuit 50 changes the method that controls the phase difference φ irrespective of the command transmission power Po, to the method that controls the phase difference $\phi$, following the command phase difference $\phi$o derived by using the command transmission power Po. Namely, if the phase difference $\phi$ has passed the dead zone, the control circuit 50 resumes the previous control method at Step S10, back from the control method at Step S30.

Having resumed the previous control method at Step S10, and if transmitting the transmission power P from the primary full-bridge circuit 200 to the secondary full-bridge circuit 300, the control circuit 50 controls the phase difference $\phi$ to be the command phase difference $\phi$o derived by using the command transmission power Po, to have the port voltage Vb adjusted to the target voltage Vbo. On the other hand, to have the port voltage Vd adjusted to the target voltage Vdo, the control circuit 50 controls the duty cycle D to be the command duty cycle Do derived by using a feedback value of the port voltage Vd detected by the detection circuit. Alternatively, to have the port voltage Vc adjusted to the target voltage Vco, the control circuit 50 controls the duty cycle D to be the command duty cycle Do derived by using a feedback value of the port voltage Vc detected by the detection circuit.

Also, having resumed the previous control method at Step S10, and if transmitting the transmission power P from the secondary full-bridge circuit 300 to the primary full-bridge circuit 200, the control circuit 50 controls the phase difference $\phi$ to be the command phase difference $\phi$o derived by using the command transmission power Po, to have the port voltage Va adjusted to the target voltage Vao. On the other hand, to have the port voltage Vc adjusted to the target voltage Vco, the control circuit 50 controls the duty cycle D to be the command duty cycle Do derived by using a feedback value of the port voltage Vc detected by the detection circuit.

Figure 5:
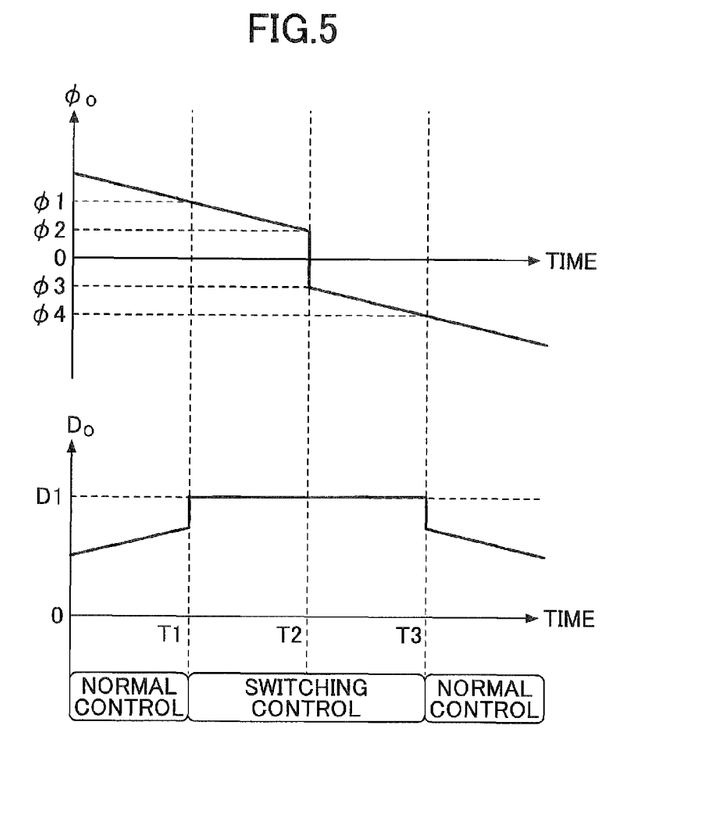
FIG. 5 is a timing chart that illustrates an example of switching control of the power transmission direction.

FIG. 5 is a timing chart that illustrates an example of the switching control of the power transmission direction in a case where the transmission power P is transmitted from the secondary full-bridge circuit 300 to the primary full-bridge circuit 200.

For example, if it is determined at Step S20 in FIG. 4 that the absolute value of the command phase difference $\phi$o derived at a calculation step T1 is not less than or equal to a predetermined phase difference $\phi$1, the control circuit 50 controls the phase difference $\phi$ to be the command phase difference $\phi$o derived at the calculation step T1.

For example, if it is determined at Step S20 that the absolute value of the command phase difference $\phi$o derived at a calculation step T2 is reduced to a phase difference $\phi$2, which is less than or equal to the predetermined phase difference $\phi$1, the control circuit 50 inverts the positive and negative of the command phase difference $\phi$o derived at the calculation step T2, to change the command phase difference $\phi$o at the calculation step T2 to a phase difference $\phi$3. The phase difference $\phi$2 is a positive value, whereas the phase difference $\phi$3 is a negative value. The absolute value of the phase difference $\phi$2 and the absolute value of the phase difference $\phi$3 may be equivalent to each other, or different from each other.

By changing the command phase difference $\phi$o from the phase difference $\phi$2 to the phase difference $\phi$3, the control circuit 50 can switch the transmission power direction, from the direction starting from the secondary full-bridge circuit 300 to the primary full-bridge circuit 200, to the direction starting from the primary full-bridge circuit 200 to the secondary full-bridge circuit 300. Namely, since the control circuit 50 controls the phase difference $\phi$, skipping over around zero where the increase and decrease of the phase difference $\phi$ do not exhibit a one-to-one correspondence with the increase and decrease of the transmission power P, it is easier to control a timing to switch the power transmission direction as intended.

In some embodiments, if it is determined at Step S20 that the absolute value of the command phase difference $\phi$o derived at the calculation step T2 is reduced to the phase difference $\phi$2, which is less than or equal to the predetermined phase difference $\phi$2, the control circuit 50 fixes the command duty cycle Do at the current calculation step T2 to the same duty cycle D1 as at the previous calculation step T1. This makes it possible to prevent the command duty cycle Do from going out of the permissible range of the duty cycle D.

For example, if it is determined at Step S40 in FIG. 4 that the absolute value of the command phase difference $\phi$o derived at a calculation step T3 is not greater than or equal to a predetermined phase difference $\phi$4, the control circuit 50 controls the phase difference $\phi$ to be the command phase difference $\phi$o at the previous calculation step T2. On the other hand, if it is determined at Step S40 that the absolute value of the command phase difference $\phi$o derived at the calculation step T3 is greater than or equal to the predetermined phase difference $\phi$4, the control circuit 50 controls the phase difference $\phi$ to be the command phase difference $\phi$o derived at the calculation step T3.

Note that at Step S30 in FIG. 4, the control circuit 50 may temporarily fix the command phase difference $\phi$o to zero, and may change the operation of the primary full-bridge circuit 200 to a boost operation from the second port 60c to the first port 60a. By having the command phase difference $\phi$o temporarily fixed to zero, transmission of the transmission power P stops temporarily. Therefore, even if the phase difference $\phi$ is controlled to be around zero, unstable fluctuation of the transmission power P can be suppressed. Also, the control circuit 50 may suppress unstable fluctuation of the transmission power P, by temporarily fixing the command phase difference $\phi$o to the phase difference $\phi$2 at Step S30 in FIG. 4.

Figure 6:
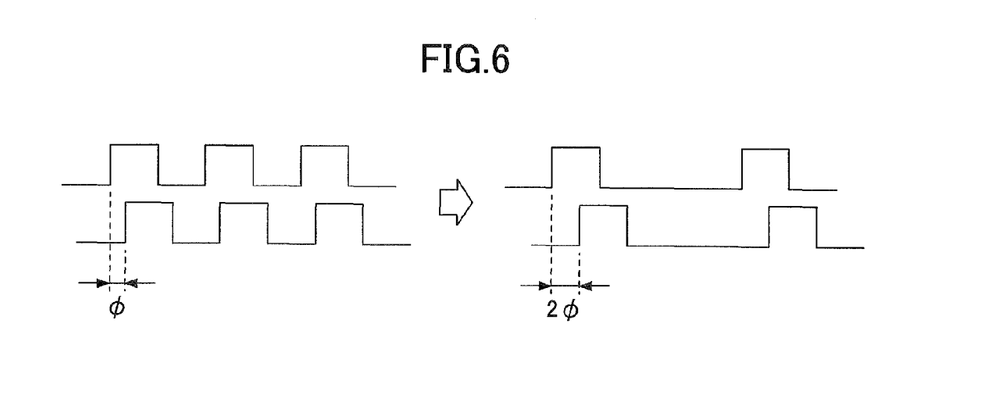
FIG. 6 is a timing chart that illustrates an example of a case where the switching frequency is reduced, and the phase difference per pulse is set greater.

Also, as illustrated in FIG. 6, the control circuit 50 may lower the switching frequency f (=1/T) of the control signal to turn on and off the arms at Step S30 in FIG. 4, and may make the phase difference $\phi$ per pulse of the control signal (namely, the phase difference $\phi$u and the phase difference $\phi$v) greater. Thus, the control circuit 50 can control the phase difference $\phi$ avoiding the dead zone around zero, without changing the magnitude of the transmission power P virtually. For example, the control circuit 50 halves the switching frequency f, and doubles the phase difference $\phi$ per pulse.

Figure 7:
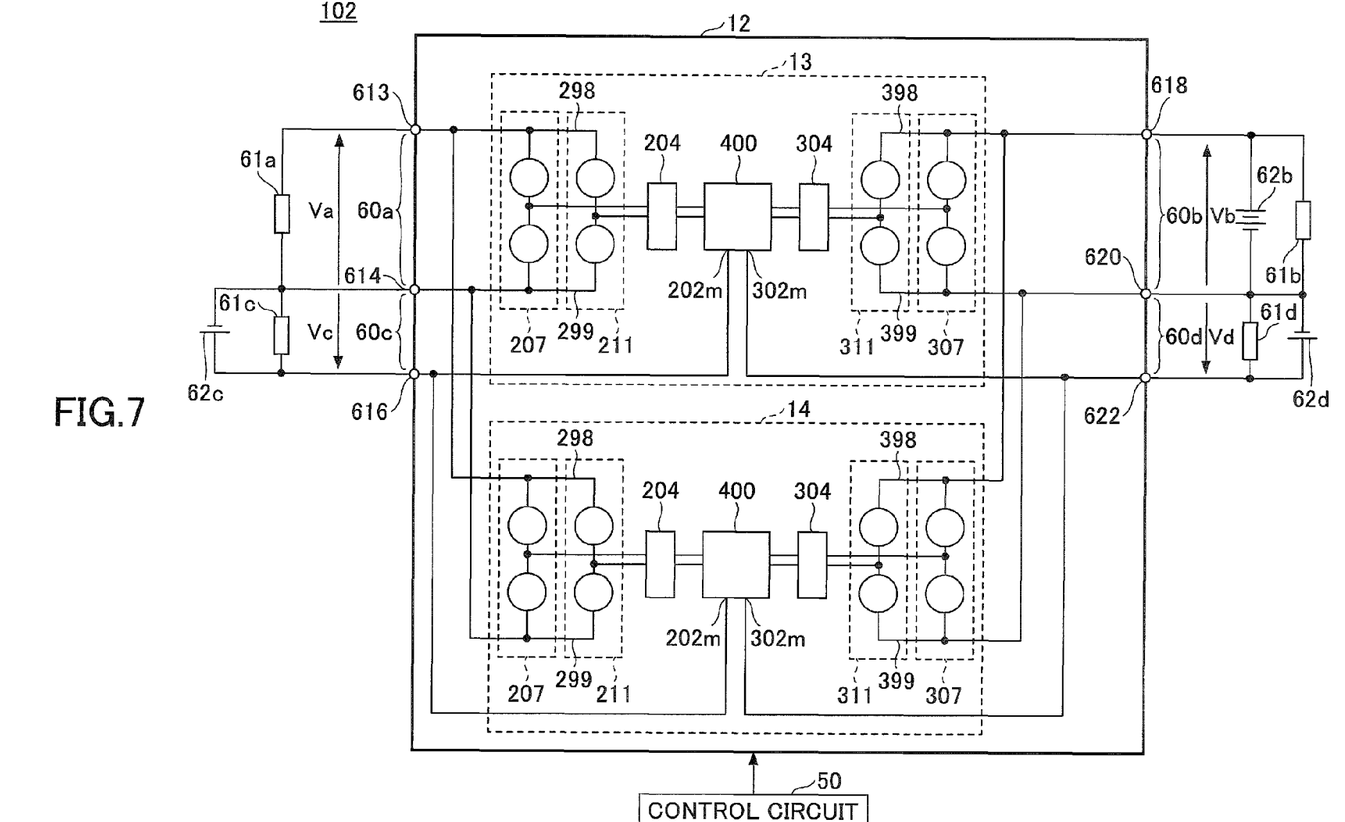
FIG. 7 is a diagram that illustrates an example of a power conversion apparatus.

FIG. 7 is a diagram that illustrates an example of a configuration of a power supply apparatus 102 as an embodiment of a power conversion apparatus. Description is simplified or omitted for the functions and effects of the same elements as in the configuration in FIG. 2. The power supply apparatus 102 includes, for example, a power supply circuit 12 and a control circuit 50. The power supply circuit 12 includes multiple converters that are connected in parallel. A converter 13 and a converter 14 have the same configuration as the converter 11 in FIG. 1. Maximum power that can be supplied by the converter 13 may be the same as or different from that of the converter 14.

The respective positive bus-bars on the primary side 298 of the converters 13 and 14 are connected with each other. The respective negative bus-bars on the primary side 299 of the converters 13 and 14 are connected with each other. The respective center taps 202m of the converters 13 and 14 are connected with each other. The respective positive bus-bars on the secondary side 398 of the converters 13 and 14 are connected with each other. The respective negative bus-bars on the secondary side 399 of the converters 13 and 14 are connected with each other. The respective center taps 302*m* of the converters 13 and 14 are connected with each other.

The control circuit 50 controls the converter 13 and the converter 14 by the same command duty cycle Do, and controls the converter 13 and the converter 14 by the same command phase difference φo.

Similarly to that described above, at Step S30 in FIG. 4, the control circuit 50 inverts the positive and negative of the command phase difference φo for both the converters 13 and 14, to switch the power transmission direction between the primary full-bridge circuit 200 and the secondary full-bridge circuit 300 in both the converters 13 and 14. Thus, the control circuit 50 controls the phase difference φ, skipping over around zero where the increase and decrease of the phase difference φ do not exhibit a one-to-one correspondence with the increase and decrease of the transmission power P, it is easier to control a timing to switch the power transmission direction as intended.

Similarly to that described above, at Step S30 in FIG. 4, the control circuit 50 may invert the positive and negative of the command phase difference φo for both the converters 13 and 14 in a state where the command duty cycle Do is fixed in both the converters 13 and 14.

Also, similarly to that described above, at Step S30 in FIG. 4, the control circuit 50 may temporarily fix the command phase difference φo to zero, and may change the operation of the primary full-bridge circuit 20 to a boost operation from the second port 60*c* to the first port 60*a*. Also, similarly to that described above, at Step S30 in FIG. 4, the control circuit 50 may temporarily fix the command phase difference φo to the phase difference φ2.

Also, similarly to that described above, at Step S30 in FIG. 4, the control circuit 50 may lower the switching frequency f of the control signal to turn on and off the arms, and may make the phase difference φ per pulse of the control signal greater.

Also, at Step S30 in FIG. 4, if the command phase difference φo of both the converters 13 and 14 is less than or equal to a predetermined value, the control circuit 50 may control the phase difference φ of one of the converters 13 and 14 to zero, and may control the phase difference φ of the other converter to the command phase difference φo. Thus, the control circuit 50 can control the phase difference φ of both the converters 13 and 14, avoiding the dead zone around zero, without changing the magnitude of the transmission power P virtually. Note that zero (the phase difference φ=0) is a singular point of the dead zone.

The claimed subject matter is not limited to the embodiments described above. Various modifications and improvements can be made within the scope of the claimed subject matter by combining and/or replacing a part of or all of the embodiments with the others.

For example, the arms are not limited to be MOSFETs, but may be other semiconductor switching elements that turn on and off. For example, the arms may be voltage-controlled power elements with insulation gates, such as IGBTs or MOSFETs, or may be bipolar transistors.

Also, there may be a power source that can be connected with the first port 60*a*. Also, there may be a power source that can be connected with the third port 60*b*, and there may be no power source that can be connected with the fourth port 60*d*. There may be no power source that can be connected with the third port 60*b*, and there may be a power source that can be connected with the fourth port 60*d*.

Also, the fourth port 60*d* may be omitted in FIG. 1. If the fourth port 60*d* is omitted, the center tap 302*m* and the magnetic coupling reactor 304 on the secondary side may be omitted.

Also, in the above description, the primary side may be defined as the secondary side, the secondary side may be defined as the primary side.

The invention claimed is:

1. A power conversion apparatus, comprising:
   a transformer comprising a primary coil and a secondary coil;
   a primary full-bridge circuit comprising the primary coil disposed at a first bridge part;
   a secondary full-bridge circuit comprising the secondary coil disposed at a second bridge part; and
   a control unit configured to control a phase difference between switching at the primary full-bridge circuit, and switching at the secondary full-bridge circuit, to adjust transmission power transmitted between the primary full-bridge circuit and the secondary full-bridge circuit,
   wherein when an absolute value of the phase difference is less than or equal to a first predetermined value, the control unit inverts a positive and a negative of the phase difference, to switch a power transmission direction between the primary full-bridge circuit and the secondary full-bridge circuit.

2. The power conversion apparatus, as claimed in claim 1, wherein the control unit inverts the positive and the negative of the phase difference when a duty cycle of switching of the primary full-bridge circuit and the secondary full-bridge circuit is fixed.

3. The power conversion apparatus, as claimed in claim 1, wherein the control unit maintains a state in which the positive and the negative of the phase difference are inverted, until the absolute value of the phase difference is greater than or equal to a second predetermined value.

4. The power conversion apparatus, as claimed in claim 3, wherein the control unit inverts the positive and the negative of the phase difference when a duty cycle of switching of the primary full-bridge circuit and the secondary full-bridge circuit is fixed.

5. The power conversion apparatus, as claimed in claim 1, wherein the control unit fixes a duty cycle of switching of the primary full-bridge circuit and the secondary full-bridge circuit before inverting the positive and the negative of the phase difference.

6. A power conversion apparatus comprising:
   a transformer comprising a primary coil and a secondary coil;
   a primary full-bridge circuit comprising a first arm circuit including a first upper arm and a first lower arm connected in series, and a second arm circuit including a second upper arm and a second lower arm connected in series, wherein the primary coil is included in a first bridge part that connects a first middle point between the first upper arm and the first lower arm and a second middle point between the second upper arm and the second lower arm;
   a secondary full-bridge circuit comprising a third arm circuit including a third upper arm and a third lower arm connected in series, and a fourth arm circuit including a fourth upper arm and a fourth lower arm connected in series, wherein the secondary coil is included in a second bridge part that connects a third middle point between the third upper arm and the third lower arm and a fourth middle point between the fourth upper arm and the fourth lower arm; and a control unit that adjusts a first phase difference between switching in the first arm circuit and switching in the third arm circuit and a second phase difference between switching in the second arm circuit and switching in the fourth arm circuit, and controls transmission power transmitted between the primary full-bridge circuit and the secondary full-bridge circuit, wherein when an absolute value of at least one of the first phase difference and the second phase difference is less than or equal to a first predetermined value, the control unit switches a power transmission direction between the primary full-bridge circuit and the secondary full-bridge circuit.

7. The power conversion apparatus, as claimed in claim 6, wherein the control unit fixes a duty cycle of switching of the primary full-bridge circuit and the secondary full-bridge circuit before switching the power transmission direction between the primary full-bridge circuit and the secondary full-bridge circuit.

8. The power conversion apparatus, as claimed in claim 6, wherein the control unit maintains the power transmission direction between the primary full-bridge circuit and the secondary full-bridge circuit until the absolute value of at least one of the first phase difference and the second phase difference is greater than or equal to a second predetermined value.

9. The power conversion apparatus, as claimed in claim 8, wherein the control unit switches the power transmission direction between the primary full-bridge circuit and the secondary full-bridge circuit when the absolute value of at least one of the first phase difference and the second phase difference is greater than or equal to the second predetermined value.

\* \* \* \* \*